(12) United States Patent
Frydendal et al.

(10) Patent No.: US 9,132,590 B2
(45) Date of Patent: Sep. 15, 2015

(54) METHOD OF MOULDING A WIND-TURBINE BLADE

(75) Inventors: Ib Frydendal, Føvling (DK); Soeren Markkilde Pedersen, Stenløse (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 794 days.

(21) Appl. No.: 13/358,597

(22) Filed: Jan. 26, 2012

(65) Prior Publication Data

US 2012/0213638 A1 Aug. 23, 2012

(30) Foreign Application Priority Data

Feb. 1, 2011 (EP) .................................... 11152904

(51) Int. Cl.
- *B29C 70/48* (2006.01)
- *B29C 33/42* (2006.01)
- *B29L 31/08* (2006.01)

(52) U.S. Cl.
CPC ............... *B29C 70/48* (2013.01); *B29C 33/424* (2013.01); *B29L 2031/082* (2013.01); *F05B 2230/00* (2013.01); *Y02E 10/721* (2013.01); *Y10T 156/14* (2015.01)

(58) Field of Classification Search
CPC ........ B29C 70/28; B29C 70/34; B29C 70/36; B29C 70/48; B29C 33/424
USPC ......................................................... 264/258
See application file for complete search history.

(56) References Cited

U.S. PATENT DOCUMENTS

| | | | | | |
|---|---|---|---|---|---|
| 2,202,042 | A | * | 5/1940 | Blount | 156/222 |
| 3,331,166 | A | * | 7/1967 | Brenning | 451/365 |
| 3,704,194 | A | * | 11/1972 | Harrier | 156/245 |
| 4,031,601 | A | * | 6/1977 | Staub et al. | 29/889.21 |
| 4,497,587 | A | * | 2/1985 | Pine | 384/117 |
| 5,222,297 | A | * | 6/1993 | Graff et al. | 29/889.71 |
| 2007/0251090 | A1 | * | 11/2007 | Breugel et al. | 29/889.7 |
| 2008/0206059 | A1 | | 8/2008 | Bech Anton | |

FOREIGN PATENT DOCUMENTS

| | | |
|---|---|---|
| GB | 2467226 A | 7/2010 |
| WO | WO 2010073675 A1 | 7/2010 |
| WO | WO 2010084320 A2 | 7/2010 |
| WO | WO2011127997 * | 10/2011 |

* cited by examiner

*Primary Examiner* — Matthew Daniels

(57) ABSTRACT

A method of molding a wind-turbine blade in a mold is described. The method includes arranging a number of markers on an interior of the mold; arranging a composite layup in the mold; and assembling and curing the composite layup in the mold such that a negative impression of a marker is formed on a surface of the composite layup, which negative impression facilitates correct positioning of the blade relative to a component in a subsequent assembly step. A mold for molding a wind-turbine blade; a wind-turbine blade molded using such a mold; and a positioning device for positioning a drilling and/or milling tool relative to a root portion of a wind-turbine blade molded using the inventive method are disclosed. A method of manufacturing a wind-turbine blade is also disclosed.

7 Claims, 3 Drawing Sheets

METHOD OF MOULDING A WIND-TURBINE BLADE

CROSS REFERENCE TO RELATED APPLICATIONS

This application claims priority of European Patent Office application No. 11152904.6 EP filed Feb. 1, 2011. All of the applications are incorporated by reference herein in their entirety.

FIELD OF INVENTION

The invention describes a method of moulding a wind-turbine blade, a mould for moulding a wind-turbine blade, a wind-turbine blade, a positioning device, and a method of manufacturing a wind-turbine blade.

BACKGROUND OF INVENTION

A blade for a wind turbine, also sometimes referred to as a rotor blade, is usually manufactured using a technique such as the closed-mould casting technique in which the entire blade can be moulded in one piece. Such a mould is usually made in two parts, with an upper half and a lower half. Glass fibre matting can be used to build up component layers in a suitably shaped mould, and the layers of matting are bonded with a resin and cured in the mould in a vacuum-assisted resin transfer moulding (VARTM) process to give a fibre-reinforced polymer or glass-reinforced plastic, generally referred to simply as 'fibreglass'. Stacked layers of resin-coated matting are generally referred to as a 'layup' or 'composite layup'. Additional resin can be pumped into the closed mould by means of a vacuum, so that the component layers are caused to press against the inside mould surface, thus assuming the desired end shape. The finished blade can then be processed (for example sanded and painted) and machined in preparation for fixing the blade to another component (for example holes may be drilled to receive bolts).

For a blade that is to have a clearly defined pressure side and a suction side, each half of the mould is shaped specifically so that the finished or cast blade has the desired form. Evidently, such an asymmetrical blade must be mounted to a hub or a pitch bearing at a precise angle, otherwise the performance of the wind turbine might be adversely affected. Therefore, before drilling holes for bolts that are used to attach a connecting part—for example a flange—to the base of the blade, or before milling the bottom edge of the blade at an angle for correct pitch, the correct orientation of the blade must be determined. In prior art manufacturing techniques, the blade (which can easily be 40 m-50 m or more in length) is supported on a frame, and the relative location of an unambiguous reference point, for example, the point at the outer edge of the blade at its widest part, is determined relative to the essentially circular base of the blade. Because of its round form, the base of the blade is generally referred to as the ring section or root portion. The large dimensions of the blade require a correspondingly long tool or device that can span the length between the reference point and the root portion. Determining a reference point in this way can be time-consuming and can add to the overall cost of the blade. Furthermore, such a technique can be error-prone, so that a machining step may not be sufficiently precisely carried out. Bolt holes that are not exactly drilled at exactly the right points, or a coning angle that is slightly offset, may be impossible to correct and may ultimately result in damage to load-bearing parts such as the pitch bearing.

SUMMARY OF INVENTION

It is therefore an object of the invention to provide a straightforward, reliable and precise way of preparing a blade for machining.

This object is achieved by a method of moulding a wind-turbine blade, by a mould for moulding a wind-turbine blade, by a wind-turbine blade, by a positioning device, and by a method of manufacturing a wind-turbine blade according to the independent claims According to the invention, the method of moulding a wind-turbine blade in a mould comprises the steps of arranging a number of markers on an interior of the mould; arranging a composite layup in the mould; and assembling and curing the composite layup in the mould such that a negative impression of a marker is formed on a surface of the composite layup, which negative impression facilitates correct positioning of the blade relative to a component in a subsequent assembly step.

An advantage of the method according to the invention is that, with the very simple technique of positioning one or more markers at one or more strategic positions in the mould, at least one negative impression or 'reference marking' appears at the desired location on a surface of the cured blade. A reference marking, which is a negative impression of the corresponding marker, can be an indentation or recess in the surface of the blade, or can protrude above the surface of the blade, depending on the geometry of the marker, as will be explained below. Depending on the location of the marker in the mould, the position of the negative impression can clearly indicates a certain location on the blade, for example to clearly identify or tag a certain position on the suction side or on the pressure side of the blade, etc. This reference marking can then be used to correctly position a tool—for example a milling tool or a drilling tool—to perform a machining step with a high degree of positional precision in order to allow the blade to be precisely connected or attached to another component such as a pitch bearing, hub, etc. For a rotor blade made without any bolt bushings and/or for a rotor blade that is to be milled to give a certain pitch angle, the method according to the invention provides a very cost-effective and reliable way of determining a fix point for pitch rotation and/or pitch angle. The steps of the method need not necessarily performed in the given sequence. For example, the composite layup can be arranged in the mould first, and a marker can subsequently be arranged on an inside surface of the interior of the mould.

According to the invention, the mould for moulding a wind-turbine blade using a composite layup comprises a number of markers arranged on an interior of the mould to form a corresponding number of negative impressions on a surface of a composite layup during assembly and/or curing of the composite layup in the mould, wherein a negative impression comprises a reference for a correct positioning of the blade relative to another component in a subsequent assembly step.

According to the invention, a wind-turbine blade is moulded using such a mould. After curing, the blade has one or more clearly defined reference markings at the locations corresponding to the positions of the marker(s) in the mould. These reference markings can appear on an outside surface of the blade, but could of course (depending on how the markers were arranged in the mould) appear on an inside surface of a hollow part of the blade, as will be explained below.

According to the invention, the positioning device for positioning a drilling and/or milling tool relative to a root portion of a wind-turbine blade, moulded using the above method in an inventive mould, comprises a number of gripping elements, wherein at least one gripping element is shaped to fit a negative impression formed by a marker of the mould on a surface of the blade.

According to the invention, the method of manufacturing a wind-turbine blade comprises the steps of moulding the blade in a mould using the inventive method described above; removing the blade from the mould; arranging a positioning device about a root portion of the blade such that a gripping element of the positioning device coincides with a negative impression on the surface of the blade; and guiding a tool along the positioning device to machine the root portion.

According to the invention, the method of manufacturing the blade is simplified while at the same time improving the degree of precision with which the blade can be machined. By clearly marking a certain position on the blade surface, a tool can be correctly and precisely applied in a machining step. For example, a drilling and/or milling tool can be placed in position using the positioning device. Since the positioning device can be unambiguously positioned relative to the blade using the negative impression formed by the marker on the blade surface, the milling tool or drilling tool can be applied to precisely perform the required machining step, for example to drill a series of bolt holes along a rim of the blade, or to mill an edge of the blade at a certain angle, etc.

Particularly advantageous embodiments and features of the invention are given by the dependent claims, as revealed in the following description. Features of different claim categories may be combined as appropriate to give further embodiments not described herein.

Such a mould can comprise a top half and a bottom half, so that one half is shaped to form the suction side of the blade, and the other half is shaped to form the pressure side of the blade, as will be known to the skilled person. Once the composite layup is ready for vacuum consolidation, the mould halves are fastened together to give an air-tight seal. The mould preferably also comprises inlets and outlets for vacuum-pumping a resin into the mould. Such a vacuum consolidation step allows the composite layup to be thoroughly wetted by the resin and also causes the composite layup to expand and press against the inside surface of the mould. In this way, the desired shape of the blade is achieved.

The markers could be placed in the mould at any position that allows a convenient and precise positioning of a tool in a later machining stage. Preferably, the number of markers is arranged on the interior of the mould in a region corresponding to a root portion or ring section region of the blade, since any reference markings in the root portion, being close to the base of the blade, will be quite easy to access. Furthermore, reference markings placed quite low down on the blade, i.e. at the end which will be closest to the hub, may conveniently be hidden, for example by a flange bolted to the root portion. One or more markers could be arranged in the mould to leave a negative impression on an interior surface of the cured blade, for example after arranging the composite layup in a mould half, a marker could be arranged to press against the surface of the layup corresponding to the interior surface of the blade root, and this marker may be attached in some suitable manner to the inside of the mould. During vacuum consolidation, then, such a marker will leave a negative impression on the root interior surface.

Such a flange is generally bolted to the blade using many bolts, for example 40 or more bolts for a blade with a root portion diameter of 200 cm or more, evenly or equidistantly spaced along the flange. The flange could be bolted to the root portion by bolts arranged to extend through bolt holes drilled radially inward from the outer surface of the root portion. However, the bolt heads of such bolts may interfere with the bolts that are used to connect the flange to its counterpart on the hub or pitch bearing. Therefore, bolt holes for connecting the flange to the root portion of the blade are usually drilled 'upward' into the body of the blade to lie essentially parallel to a longitudinal axis of the blade. A corresponding flange for the pitch bearing may be already mounted on the hub, or may be shaped so that it can only be mounted at a certain orientation. Therefore, it is important to precisely drill holes into the root section so that the flange can be accurately attached to the blade, and so that this in turn can be correctly bolted to the corresponding flange on the pitch bearing. Therefore, in a preferred embodiment of the invention, one marker is arranged on the interior of the mould in a region corresponding to the centre of the pressure side or the suction side of the blade, i.e. such a marker can be arranged at a point midway along the root portion on either the pressure side or the suction side of the blade. A single such marker can be sufficient to correctly identify a point on the root portion at which a bolt hole should be drilled. For a series of equidistant bolts, a single marker is therefore sufficient to determine the position of all such bolt holes.

Of course, the reliability of the method according to the invention can be increased by using more than just one marker. Therefore, in a further preferred embodiment of the invention, two markers are arranged preferably at essentially diametrically opposed points on the interior of the mould. For example, a single marker as described above can be located at points in the mould that correspond to points midway along the root portion on both suction side and pressure side of the blade.

As mentioned above, a blade can be mounted to the hub in such a way that it is tilted slightly with respect to a vertical plane through the hub. To mount the blade in such a way without having to redesign the hub and pitch bearings, usually the base of the root portion is milled to form a coning angle. Once the coning angle has been milled, an additional drilling step can be carried out as described above to drill bolt holes for attaching a flange to the root portion. However, the coning angle must be very precisely milled if the blade is to have the correct angle relative to the hub. Therefore, in a particularly preferred embodiment of the invention, three markers are arranged preferably essentially equidistantly about the interior of the mould, so that three reference markings are available for the correct positioning of a milling tool. For example, one marker can be placed at a point in the mould corresponding to a point essentially half-way along the root portion on the pressure side of the blade, while two other markers are arranged at points corresponding to points along the root portion on the suction side of the blade. Then, when the blade has been cured and removed from the mould, the reference markings can be used to quickly determine how the milling tool should be placed relative to the root portion of the blade in order to form the coning angle.

As already indicated, the geometry of a negative impression depends on the geometry of the corresponding marker. A marker could simply be a relatively deep groove on the inside surface of a mould half. Then, during vacuum consolidation, when the outer layer of the composite layer stack is pressed against the inside surface of the mould, a corresponding region on the outer composite layer may be pressed into the groove. After curing, a tangible raised ridge would remain on the outer surface of the blade. However, the composite layers are generally quite rigid, so that the raised reference marking may not be very noticeable. Therefore, in a particularly preferred embodiment of the invention, the step of arranging a marker on the inside surface of the mould comprises forming a raised element to extend into an interior cavity of the mould, such that the negative impression formed by the marker comprises a recess in the surface of the cast blade. For example, a marker in the shape of a stud or pin can form a clearly noticeable indentation or recess in the composite layup as this is pressed against the mould inside surface during vacuum consolidation.

A marker could be arranged in the mould such that, after curing, the marker is embedded in the blade body and can be lifted out. However, the marker would then have to be arranged in the mould again before casting the next blade. Therefore, in a particularly preferred embodiment of the invention, the marker comprises a marker body firmly connected to a frame of the mould. Preferably, such a marker body comprises a metal body, since a mould construction for a large blade generally comprises a steel frame for supporting the mould itself. A metal marker body could preferable be welded to such a steel frame.

A marker can have any suitable shape. Preferably, the marker is shaped so that it can easily be separated from the cured blade when the mould is opened. To remove the cured blade from the mould, the two halves are disconnected from each other and the top half is generally lifted off. If two markers are arranged in the top half, these are preferably shaped so that they both easily withdraw from the body of the cured blade. Therefore, in a preferred embodiment of the invention, the marker comprises a tapered form. For example, the marker can have a conical shape that is widest at the base (i.e. closest to the mould inner surface) and can taper gradually over its length to a point.

The negative impression or reference marking made by a marker in the surface of the cured blade serves the purpose of placing a positioning device for a drilling and/or milling tool. To this end, a gripping element of the positioning device preferably fits the negative impression made by the marker. Therefore, the shape of the gripping element preferably matches the shape of the marker itself. In a particularly preferred embodiment of the invention, identical elements are used for a marker and its complementary gripping element. For example, two identical cone-shaped metal pieces can be put to use, one being welded to a steel frame of mould to act as a marker, and one being fastened to a positioning device to act as a gripping element. Evidently, if more than one marker is used, differently shaped marker/gripping element pairs can be implemented to give a set of reference markings and a corresponding set of gripping elements.

The positioning device preferably attaches to the root portion in a secure manner without rotating or slipping. To this end, at least one marker preferably has a shape that prevents the positioning device from slipping when the gripping element is inserted or fitted onto the reference marking left by that marker. Therefore, in a preferred embodiment of the invention, the marker comprises a regular polygonal cross-section, for example a triangular or a rectangular cross section, since the presence of corners in the reference marking can effectively prevent the gripping element from moving, and can therefore prevent the positioning device from an unwanted rotational movement relative to the root portion. In this way, a favourably precise control of a drilling or milling tool can be achieved.

A positioning device can preferably be used for positioning a tool against the root portions of various different blade models, so that it is not necessary to manufacture a positioning tool for each size or model of blade. Depending on the blade size or on the diameter of the root section, one, two, three or more markers may be arranged in the mould to form a corresponding number of reference markings on the blade surface. Therefore, in a further preferred embodiment of the invention, the positioning tool preferably comprises an adjusting means for adjusting the position of a gripping element to match the position of a corresponding marker of the mould.

Once the blade root portion has been machined, it can be connected to the pitch bearing of a hub. Thereafter, any reference markings on the outside surface of the blade root portion cannot be seen from within a maintenance area inside the hub. However, it may be necessary at some point to determine, from within the hub, the orientation of the blade, or pitch angle position, relative to the pitch bearing. Therefore, in a particularly preferred embodiment of the invention, the positioning means comprises marking means for making at least one mark on an interior surface of the root portion of a blade. For example, a gripping means can be realised to make a mark on the interior surface of the root section, which mark preferably corresponds to the position of the reference marking on the exterior surface of the root portion. In this way, any arrangement of reference markings defining the pitch angle of the blade will be 'mirrored' on the inside surface of the blade root, where they can easily be seen and interpreted by maintenance workers.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
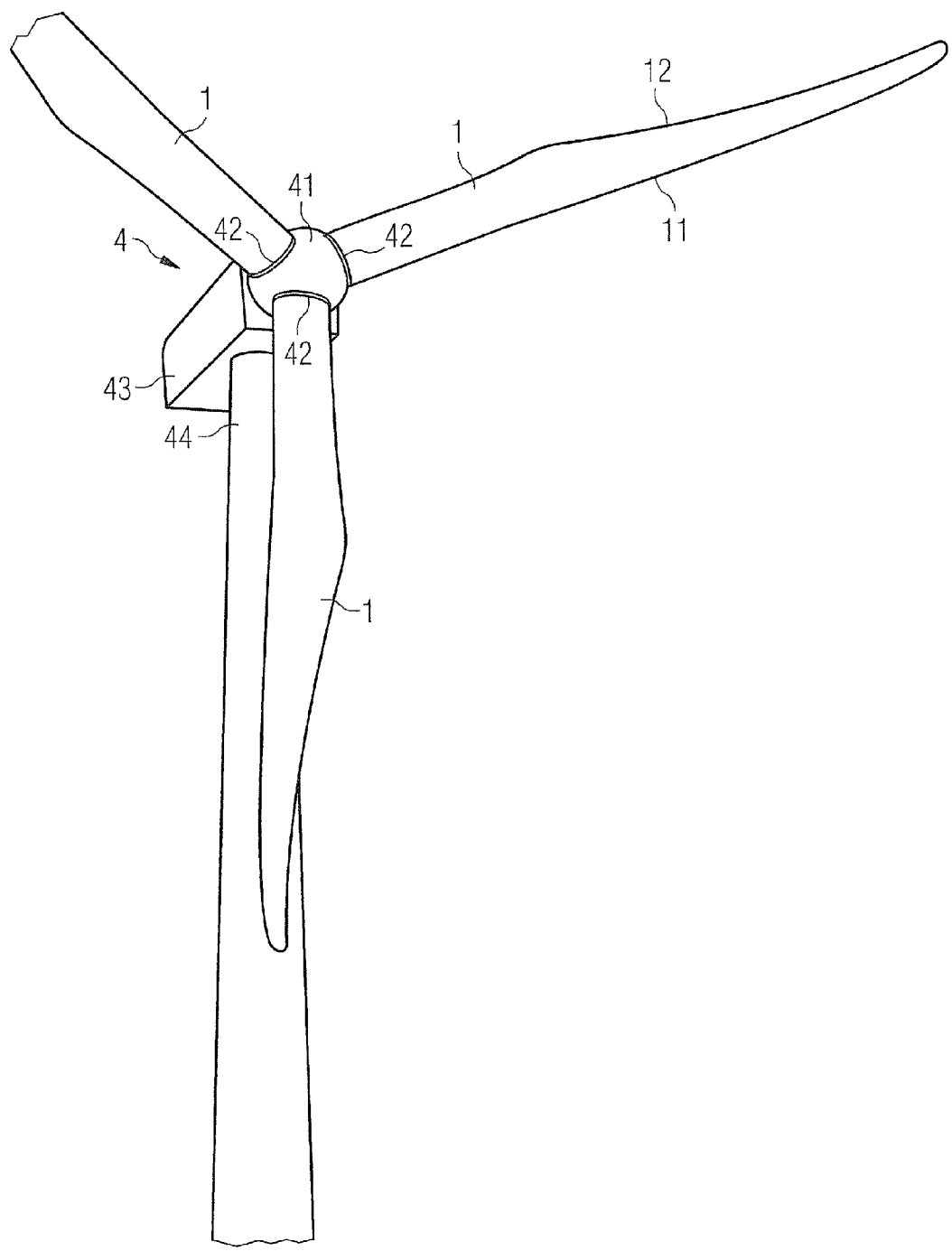
FIG. 1 shows a simplified drawing of a wind turbine.

FIG. 1 shows a simplified drawing of the hub region of a wind turbine 4 showing three blades 1 connected to pitch bearings of a hub 41 by means of flanges, and wherein the hub 41 is mounted on a nacelle 43 borne by a tower 44. A blade 1 has a clearly defined pressure side 12 and a suction side 11 so that it can easily be made to move by wind. As the skilled person will appreciate, such a blade 1 must be connected to the pitch bearing 41 in a precise manner for its behaviour to be optimal. Precision in connection is even more important for a blade 1 with a machined coning angle, since this coning angle determines the angle subtended between the blade 1 and a horizontal plane through the hub 5. The descriptions of the following drawings illustrate how a blade 1 according to the invention is prepared for machining so that bolt holes can be precisely drilled in the root portion for attachment of a flange and so that the coning angle of the root portion can be precisely milled.

Figure 2:
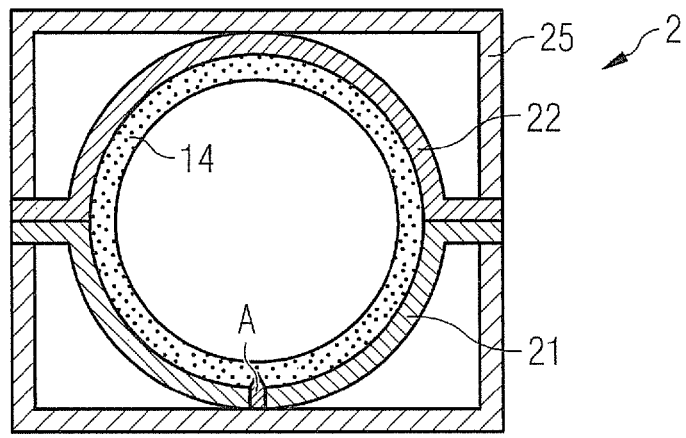
FIG. 2 shows a simplified cross-section through a composite layup in a first embodiment of a mould according to the invention.
Figure 3:
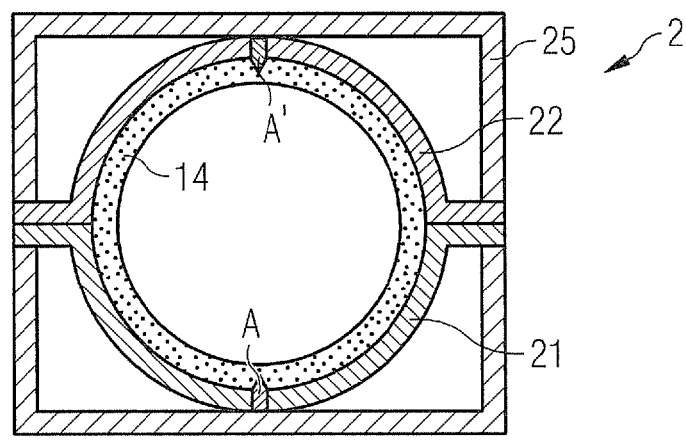
FIG. 3 shows a simplified cross-section through a composite layup in a second embodiment of a mould according to the invention.
Figure 4:
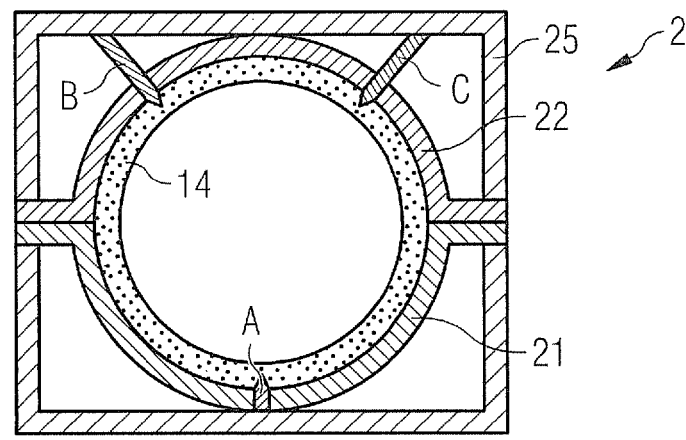
FIG. 4 shows a simplified cross-section through a composite layup in a third embodiment of a mould according to the invention.

FIGS. 2-4 show simplified cross-sections through a composite layup 14 and mould 2 in several embodiments of the mould 2 according to the invention. The mould 2 comprises a lower half 21 and an upper half 22. The lower half 21 can be shaped to define the shape of the suction side 11 of the blade 1, while the upper half 22 can shape the pressure side 12 of the blade 1, or vice versa. A composite layup 14 is arranged or built up, usually around a core or mandrel (which is not shown in the diagram for the sake of simplicity). These cross sections are taken through a region corresponding to the base of the finished blade close to the root portion. FIG. 2 shows a single marker A arranged at some point on the inside surface of the mould 2 to protrude into the interior of the mould 2 such that, during vacuum consolidation, the body of the marker A will be pressed into the outer surface 13 of the composite layup 14. Such a marker preferably extends only some way into the composite layup, for example to a depth of one quarter of the thickness of the composite layup, or one half, etc., so that a satisfactorily dimensioned negative impression is formed without compromising the structural properties of the finished blade. The position of this marker A can indicate the location on the root portion of the finished blade at which a bolt hole is to be drilled. For the usual case in which all flange bolt holes are drilled equidistantly into the root circle, the single marker A therefore suffices to define the positions of all bolt holes in the bolt arrangement.

FIG. 3 shows two markers A, A' arranged essentially at diametrically opposite points on the interior of the mould 2 so that a first marker A is placed essentially half-way along the lower half 21 of the mould 2, for example halfway along the mould half 21 that shapes the suction side of the blade, while the other marker A' is placed essentially half-way along the other half 22 of the mould 2, for example halfway along the mould half 22 that shapes the pressure side of the blade. This arrangement of markers can offer a higher degree of precision when arranging a milling and/or drilling tool against the root portion of the finished blade.

FIG. 4 shows three markers A, B, C arranged essentially equidistantly around the interior of the mould 2 so that a first marker A is placed essentially half-way along one half of the mould 21, for example halfway along the mould half 21 that shapes the suction side of the blade. The other two markers B, C are arranged on the interior of the other mould half 22. This arrangement of markers can allow a high degree of precision when arranging a milling tool relative to the root portion of the finished blade in order to correctly mill a coning angle.

Figure 5:
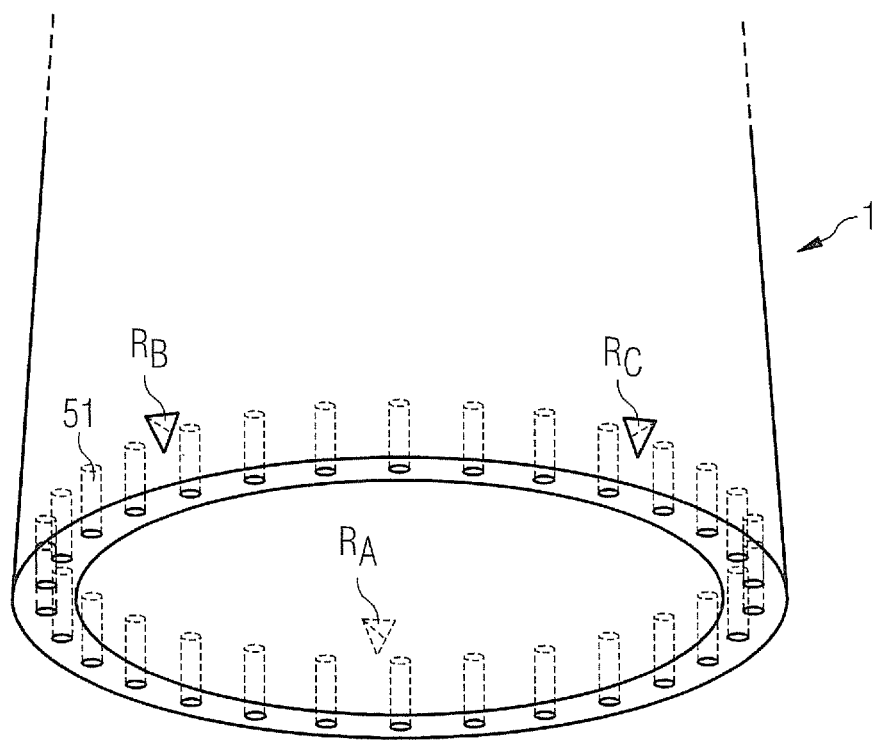
FIG. 5 shows a root portion of a blade manufactured using the method according to the invention.

FIG. 5 shows a root portion 10 of a blade 1 manufactured using the method according to the invention in the third version of the mould 2 described in FIG. 4 above. The diagram shows the two negative impressions $R_B$, $R_C$ or reference markings $R_B$, $R_C$ made on one side of the blade 1 by the two markers B, C. The third reference marking $R_C$ is indicated by the broken line. The reference markings $R_A$, $R_B$, $R_C$ can be used to arrange a milling and/or drilling tool in place against the blade root portion, for example to precisely drill evenly-spaced bolt holes 51 (indicated by the dotted lines). As the diagram shows, the reference markings $R_A$, $R_B$, $R_C$ have been formed in a region of the blade 1 close to its open end, so that these reference markings $R_A$, $R_B$, $R_C$ will be hidden or covered by a flange later connected to the blade 1 by means of machined bolt holes.

Figure 6:
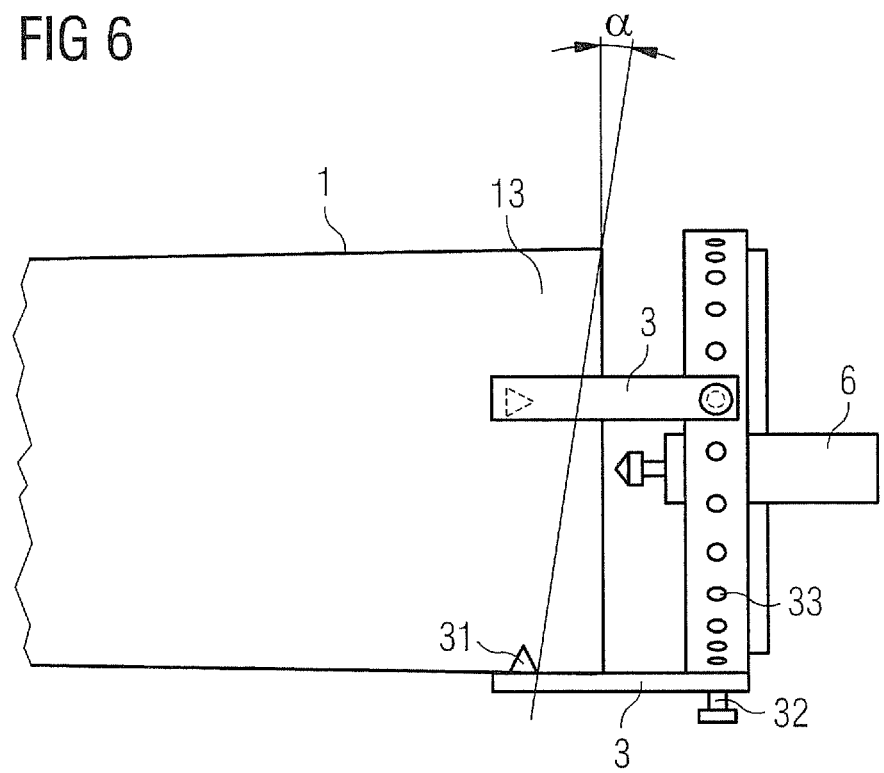
FIG. 6 shows a positioning device according to the invention in place around the root portion of FIG. 5.

FIG. 6 shows a positioning device 3 according to the invention in place around the root portion of the blade 1. While the first reference marking $R_A$ can dictate the positions of a first bolt hole (and therefore all other bolt holes) to be drilled into the base of the root portion, the other two reference markings $R_B$, $R_C$ can define the upper surface or pressure side of the blade, so that a positioning device 3 can be used to correctly arrange or guide a milling tool 6 for milling the coning angle α. The positioning device 3 comprises gripping elements 31 that are shaped to fit the reference markings $R_A$, $R_B$, $R_C$ made by the markers A, B, C in the outer surface 13 of the blade 1. In this example, the markers A, B, C had a triangular cross-section, and the gripping elements $R_A$, $R_B$, $R_C$ exhibit the same geometry as the markers A, B, C. In this way, the gripping elements $R_A$, $R_B$, $R_C$ can securely grip the root portion 10 of the blade 1 while guiding a drilling tool while it drills holes 51 into the root portion 10 for flange bolts, and while guiding a milling tool 6 while it machines the coning angle α. To allow the positioning device 3 to be used with different arrangements of reference markings, the gripping elements 31 can be moved as required using adjusting means 32, 33, in this case a fastener 32 and an arrangement of openings 33 to allow for various constellations of gripping elements 31.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of moulding a wind-turbine blade in a mould comprising:
    arranging a plurality of markers on an interior circular root portion of the mould;
    arranging a composite layup in the mould such that the plurality of markers abut a surface of the composite layup about at least a portion of a circumference of the composite layup;
    introducing a resin to the composite layup within the mould;
    curing the resin to form the wind turbine blade; and
    separating the blade from the mould and markers to expose negative impressions on a surface of the formed wind turbine blade at a circular root portion thereof, each impression corresponding to a respective one of the markers.

2. The method according to claim 1,
    wherein the plurality of markers includes two markers which are arranged at essentially diametrically opposed points on the interior circular root portion of the mould.

3. The method according to claim 1,
    wherein the plurality of markers includes three markers which are arranged essentially equidistantly about the interior circular root portion of the mould.

4. The method according to claim 1,
    wherein the plurality of markers arranged on the interior circular root portion of the mould are raised elements which extend into an interior cavity of the mould in order to form a respective negative impression, and wherein each of the negative impressions comprises a recess in the surface of the formed blade.

5. A method of manufacturing a wind-turbine blade comprising:
- arranging a plurality of markers on an interior circular root portion of the mould;
- arranging a composite layup in the mould such that the plurality of markers abut a surface of the composite layup about at least a portion of a circumference of the composite layup;
- introducing a resin to the composite layup within the mould;
- curing the resin to form the wind turbine blade;
- separating the blade from the mould and markers to expose negative impressions on a surface of the formed wind turbine blade at a circular root portion thereof, each impression corresponding to a respective one of the markers;
- arranging a positioning device about a root portion of the blade after separating the blade from the mould and markers such that a gripping element of the positioning device matches a negative impression on the surface of the blade; and
- guiding a drilling and/or milling tool along the positioning device to machine the root portion.

6. The method of claim 5, wherein a drilling tool is provided, and wherein the method further comprises drilling a plurality of bolt holes at the root portion in a direction of a longitudinal axis of the blade via the drilling tool.

7. The method of claim 5, wherein a milling tool is provided, and wherein the method further comprises milling the root portion of the blade to form a coning angle.

* * * * *